United States Patent
Ben Ahmed et al.

(10) Patent No.: US 10,059,206 B2
(45) Date of Patent: Aug. 28, 2018

(54) METHOD FOR CONTROLLING AN ELECTRIC TRACTION SYSTEM AND CORRESPONDING ELECTRIC TRACTION SYSTEM

(71) Applicant: RENAULT s.a.s, Boulogne-Billancourt (FR)

(72) Inventors: Walid Ben Ahmed, Voisins le Bretonneux (FR); Pietro Dolcini, Paris (FR); Islam Ait-Hammouda, Antony (FR); Pascal Le-Neel, Aubergenville (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 23 days.

(21) Appl. No.: 15/021,446

(22) PCT Filed: Sep. 12, 2014

(86) PCT No.: PCT/FR2014/052269
§ 371 (c)(1),
(2) Date: Mar. 11, 2016

(87) PCT Pub. No.: WO2015/036712
PCT Pub. Date: Mar. 19, 2015

(65) Prior Publication Data
US 2016/0221444 A1    Aug. 4, 2016

(30) Foreign Application Priority Data
Sep. 16, 2013   (FR) ...................................... 13 58903

(51) Int. Cl.
*B60L 3/00*     (2006.01)
*B60L 3/12*     (2006.01)

(52) U.S. Cl.
CPC ........... *B60L 3/0061* (2013.01); *B60L 3/0046* (2013.01); *B60L 3/0069* (2013.01); *B60L 3/12* (2013.01); *B60L 2240/425* (2013.01)

(58) Field of Classification Search
None
See application file for complete search history.

(56) References Cited

U.S. PATENT DOCUMENTS 9,664,716 B1 * 5/2017 Zelm ...................... G01R 27/02
2009/0002903 A1   1/2009 Uchida
(Continued)

FOREIGN PATENT DOCUMENTS

| CN | 101478202 A * | 1/2008 | ........... Y02E 10/725 |
| DE | 10 2011 076 183 A1 | 11/2012 | |
| EP | 1 981 143 A1 | 10/2008 | |

OTHER PUBLICATIONS

International Search Report dated Feb. 10, 2015 in PCT/FR2014/052269 filed Sep. 12, 2014.
(Continued)

*Primary Examiner* — Mussa A Shaawat
*Assistant Examiner* — Abdhesh K Jha
(74) *Attorney, Agent, or Firm* — Oblon, McClelland, Maier & Neustadt, L.L.P.

(57) ABSTRACT

A method controls an electric drive system of a vehicle including an electric drive motor, a drive battery, and a drive inverter. The method includes detecting that a measurement of an insulation resistance between the battery and a chassis of the vehicle is below a preset threshold, detecting a closed state of relays connecting the battery to the inverter, and following the detecting the measurement and the detecting the closed state, activating a cooling fan of the electric drive (Continued)

Figure 1:
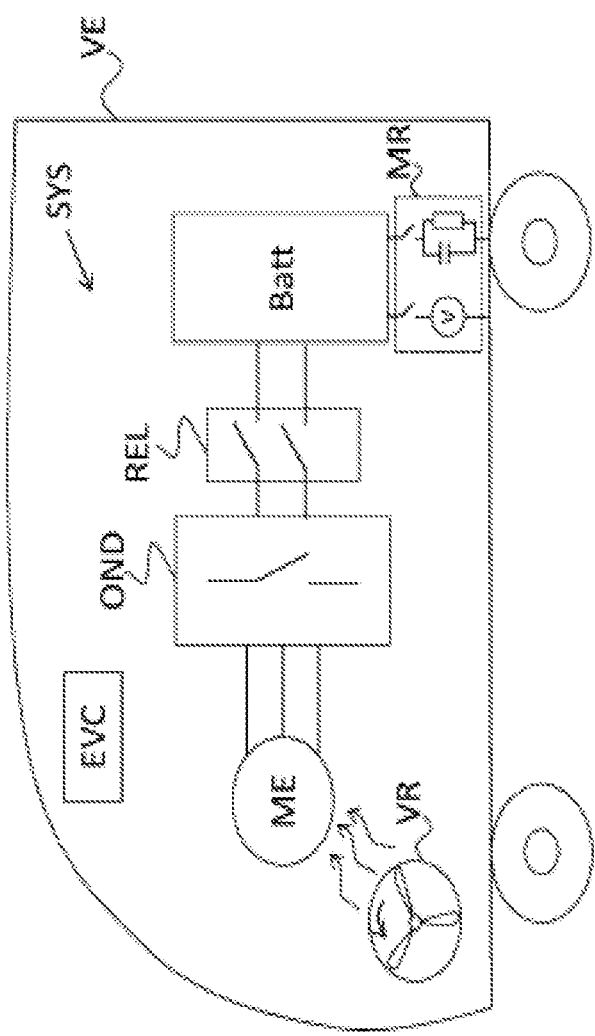

motor until detecting that a measurement of the insulation resistance is above the preset threshold, within a limit of a first preset duration.

12 Claims, 2 Drawing Sheets

(56) References Cited

U.S. PATENT DOCUMENTS

| | | | | |
|---|---|---|---|---|
| 2011/0260670 A1* | 10/2011 | Hessert | ................... | H02P 29/00 318/700 |
| 2014/0002096 A1* | 1/2014 | Mizoguchi | ............. | A61B 5/021 324/503 |
| 2014/0120890 A1* | 5/2014 | Barrett | .................. | H04W 4/001 455/418 |

OTHER PUBLICATIONS

French Search Report dated May 14, 2014 in FR 1358903 filed Sep. 16, 2013.

* cited by examiner

METHOD FOR CONTROLLING AN ELECTRIC TRACTION SYSTEM AND CORRESPONDING ELECTRIC TRACTION SYSTEM

The present invention relates, generally, to the fields of electricity and hybrid or electric automotive vehicles. More precisely, the invention relates to a drive system for at least partially electrically driven vehicles.

Such a vehicle includes at least one drive battery powering, via an inverter, an electric motor. Since the drive battery has an open-circuit voltage possibly of as high as 400 V, it is necessary to insulate the drive system powered by this drive battery from the chassis of the vehicle. Thus, personnel performing maintenance of the vehicle are protected from the risk of electrocution associated with simultaneously touching the chassis and one of the terminals of the drive battery of the vehicle.

The insulation resistance between the drive battery of the vehicle and the chassis of the vehicle is continuously measured during operation of the vehicle, as for example described in European patent application EP 1 981 143. As soon as this insulation resistance drops below a certain threshold, operation of the vehicle is restricted, for example subsequent use of the electric motor is prevented. In addition, recharging of the drive battery is prevented given that the touch current passing through a user is liable to become large for example if the vehicle uses an integrated charger not insulated by a galvanic transformer from the external power grid recharging the drive battery.

Now, the insulation resistance of such an at least partially electrically driven vehicle is liable to drop rapidly in the presence of moisture, especially when the electric motor is not sealed. Specifically, in the presence of moisture one or more leakage currents flow between the windings of the stator of the electric motor and the housing of the electric motor, or between these windings and a packet of sheets forming the stator, or even between these windings and the rotor of the electric motor. There is therefore a risk that the safety mechanisms associated with surveillance of the insulation resistance of the vehicle will frequently restrict the recharging of the drive battery, and use of the vehicle to a degraded mode for example preventing or limiting the electric mode.

One of the aims of the invention is to remedy at least some of the drawbacks of the prior art by providing a method for controlling an electric drive system of a vehicle and a corresponding electric drive system that increase the availability of this electric drive system to the user.

To this end, the invention proposes a method for controlling an electric drive system of a vehicle including an electric drive motor, a drive battery and a drive inverter, said method including:
  a step of detecting that a measurement of an insulation resistance between said battery and the chassis of the vehicle is below a preset threshold; and
  a step of detecting the closed state of relays connecting said battery to said inverter;
  characterized in that said detecting steps are followed by a step of activation of a cooling fan of said electric drive motor, until a step of detection that a measurement of said insulation resistance is above said preset threshold, within the limit of a first preset duration.

By virtue of the invention, when the insulation resistance of the vehicle is detected to be below a preset threshold, the electric motor of the vehicle is dried as soon as possible in order to dehumidify the latter. This allows the insulation resistance of the vehicle to return to a value not restricting use of the electric drive system, in the case where the decrease in the insulation resistance of the vehicle is due to moisture. This strategy of drying the electric motor allows a maximum of water blocked in the motor to be removed and therefore also use of the electric motor to be prolonged as it prevents degradation of the insulation between the windings of the stator and the cylinder head.

According to one advantageous feature of the controlling method according to the invention, said detecting steps are furthermore followed, when the inverter is in drive mode, by a step of applying a degraded control mode to said electric motor, promoting Joule heating, until a step of detection that a measurement of said insulation resistance is above said preset threshold, within the limit of a second preset duration.

In this degraded control mode applied to the combustion engine, stator currents are injected allowing not only the torque required by the driver to be obtained, but also the electric motor to be heated so as to promote the drying of the motor initiated by the cooling fan. Thus, the restoration of the insulation resistance of the vehicle to a value that does not restrict use of the vehicle is accelerated, in the case where the low value of this insulation resistance was due to moisture.

According to one advantageous feature of the controlling method according to the invention, if at the end of the first or second preset duration a measurement of said insulation resistance is detected to be below said preset threshold, said method includes a step of applying a degraded mode preventing the recharging of said battery by an external power grid.

Specifically, if at the end of a certain time the insulation resistance has not been restored despite the drying strategy implemented, it is deduced therefrom that the insulation fault is not due to moisture. Thus application of the drying strategy is stopped in order to pass to a degraded use mode of the vehicle, preventing recharging of the drive battery and for example using only a combustion engine, or signaling via a user interface that maintenance needs to be carried out regarding the insulation resistance.

The invention also relates to an electric drive system for a vehicle including an electric drive motor, a drive battery, a drive inverter and a fan for cooling said electric drive motor, said drive system furthermore including:
  means for measuring an insulation resistance between said battery and the chassis of the vehicle;
  means for comparing the measurements issued from said measuring means with a preset threshold; and
  means for detecting the closed state of relays connecting said battery to said inverter,
  said electric drive system being characterized in that said detecting means are able, when said measurements are below said preset threshold, to activate said fan for as long as the insulation resistance measured by said measuring means remains below said preset threshold, within the limits of a first preset duration.

Advantageously, said detecting means are furthermore able to activate, when the inverter is in drive mode and when said measurements are below said preset threshold, means for controlling the electric motor into a degraded mode promoting Joule heating, for as long as the insulation resistance measured by said measuring means remains below said preset threshold, within the limit of a second preset duration.

Advantageously, said system according to the invention furthermore includes means able to activate a degraded mode preventing the recharging of said battery by an external power grid, when the insulation resistance measured by said measuring means remains below said preset threshold at the end of the first or second preset duration.

The electric drive system according to the invention has analogous advantages to those of the controlling method according to the invention.

Figure 2:
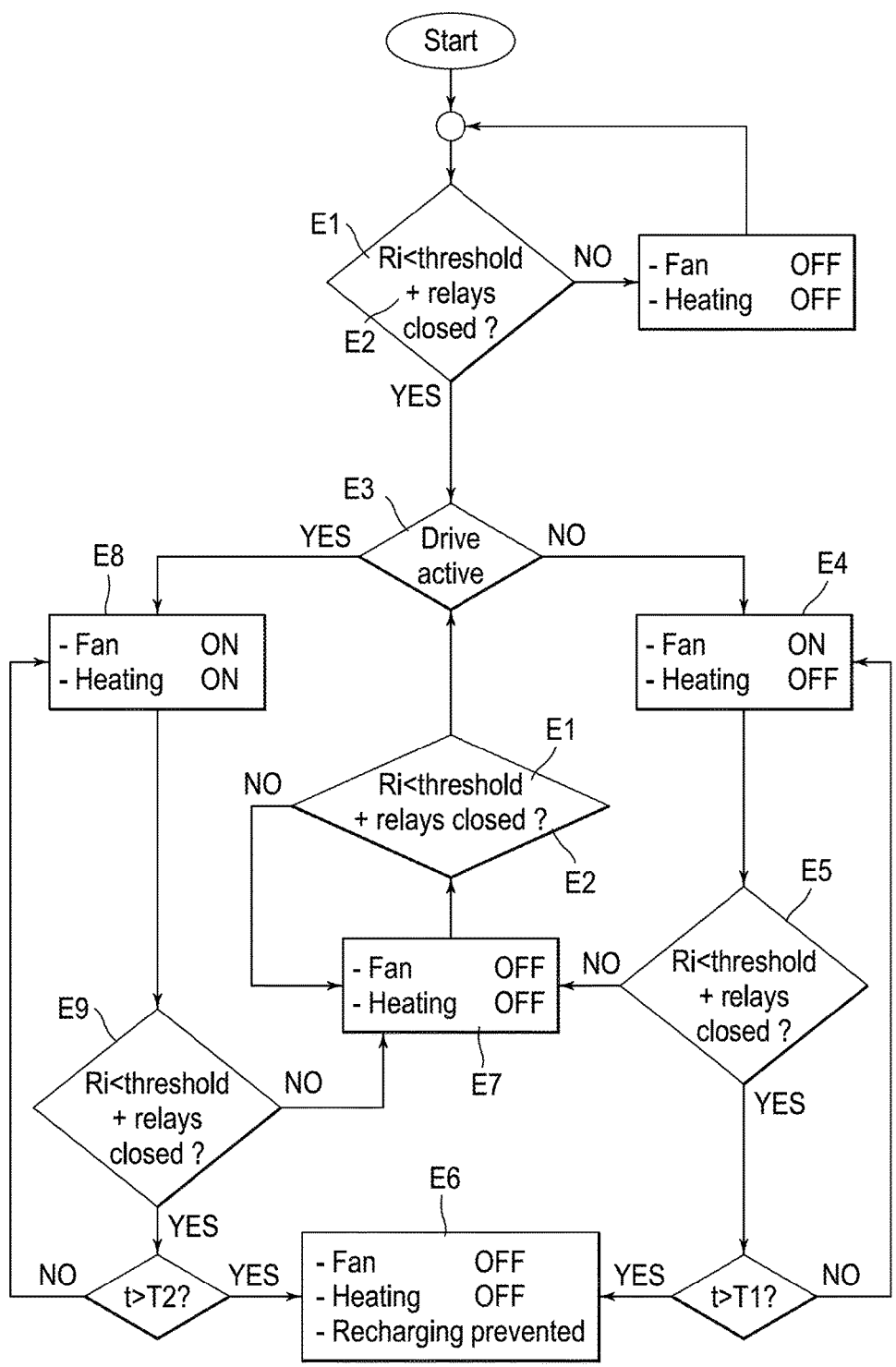

Other features and advantages will become apparent on reading about one preferred embodiment described with reference to the figures, in which:

FIG. 1 shows an electric drive system according to the invention in this preferred embodiment; and FIG. 2 shows steps of a controlling method according to the invention in this preferred embodiment.

According to one preferred embodiment of the invention, shown in FIG. 1, an electric drive system SYS of an electric vehicle VE includes:

- an electric drive motor ME;
- a drive inverter OND; and
- a drive battery Batt, allowing the electric motor ME to be powered in drive mode, i.e. when the vehicle VE is moving, via the drive inverter OND. In this Application the drive mode implies that the stator and/or rotor currents are non-zero, i.e. that the inverter is controlled to react to a motor torque setpoint. This drive mode excludes the recharge mode of the drive battery Batt.

Relays REL allow the drive battery Batt to be electrically connected to the inverter OND, which moreover receives control setpoints of the electric motor ME on its transistors from an electronic control unit, also forming part of the drive system SYS.

The electric drive system SYS also includes a cooling fan VR allowing the electric motor ME to be cooled in drive mode.

The drive system SYS also includes means MR for measuring an insulation resistance between the drive battery Batt and the chassis of the vehicle VE. These measuring means MR for example include a voltmeter V able to be connected between the chassis and each of the terminals of the drive battery Batt by means of control switches, and an impedance of known value also able to be connected between the chassis and each of the terminals of the drive battery Batt. When the known impedance value and the voltmeter V are connected between the chassis and one of the terminals of the battery, the measurement taken by the voltmeter V allows a processor EVC of the vehicle VE and of the drive system SYS to deduce therefrom the insulation impedance existing in parallel between the chassis of the vehicle VE and this terminal of the battery Batt. The processor EVC then determines the insulation resistance Ri of the vehicle as the mean of the insulation impedances existing between each of the terminals of the drive battery Batt and the chassis of the vehicle VE. The measurements carried out by the measuring means MR or the processor EVC are optionally filtered in order to remove measurement noise. In this case, the method according to the invention uses the filtered insulation resistance Ri measurement values.

This insulation resistance measurement issued from the measuring means MR and processor EVC is compared by the latter, once the vehicle VE is in operation, to a preset threshold equal for example to 80 k$\Omega$ (kilo-ohms). This preset threshold is preferably set slightly above a critical threshold of 67 k$\Omega$ for example preventing recharging of the drive battery Batt.

When the measured insulation resistance Ri is below this preset threshold, the processor EVC implements a strategy of drying the electric motor ME in order to attempt to make this insulation resistance Ri increase above this preset threshold in order to avoid passage to a degraded mode of the use of the vehicle VE.

To do this, the processor EVC supervises the relays REL of the drive battery, the inverter OND and the cooling fan VR. More precisely, it implements a controlling method according to the invention, shown in FIG. 2 in the form of an algorithm including steps E1 to E9.

Step E1 is the detection that an insulation resistance Ri measurement is below the preset threshold.

Parallel to this step E1, the processor EVC detects the closure of the relays REL between the drive battery Batt and the inverter OND, in a step E2. Provided that these relays REL are not closed, the drying strategy is not implemented. Specifically, turning on the cooling fan VR under these conditions would run the risk of emptying the 14 V deep-cycle battery of the vehicle VE. If the relays REL are already closed in step E1, this step E2 amounts to verifying the closed state of the relays REL.

When the insulation resistance Ri is detected to be below the preset threshold in step E1 and the relays REL are detected to be closed in step E2, it is determined in a step E3 whether the vehicle VE is in drive mode or not. If the vehicle VE is in drive mode then step E8 described below is passed to, otherwise step E4 is passed to.

Step E4 is the activation of the cooling fan VR. Preferably, in this step E4 the fan VR is operated at its maximum speed in order to remove as much water as possible from the interior of the electric motor ME. This activation step E4 is carried out:

- provided that it is not detected, in a step E5, that the measured insulation resistance Ri has increased above the preset threshold, or that the relays REL have opened; and
- within the limit of a duration t of activation of the fan VR, which duration is shorter than a preset activation duration T1 of 10 minutes for example. This activation duration T1 is calibrated depending on the time required to re-establish a satisfactory level of insulation in the case where the insulation fault is due to moisture and only the fan VR alone is used as the means for drying the electric motor ME.

If in a step E5 it is detected that the measured insulation resistance Ri has increased above the preset threshold, or that the relays REL have opened, then the cooling fan VR is deactivated in a step E7.

Likewise, if in step E4 the duration of activation of the fan VR reaches the preset duration T1 then the fan VR is deactivated in a step E6, and a degraded mode of use of the vehicle VE, in which recharging of the drive battery Batt is prevented, is applied. This makes it possible to avoid drying the electric motor ME when the insulation fault detected in step E1 comes from somewhere other than the electric motor ME. Application of this degraded mode furthermore prevents the processor EVC from re-implementing a strategy of drying the electric motor the next time the electric vehicle is started up or the next time it is attempted to recharge the drive battery Batt.

Step E8 is:

- the activation of the cooling fan VR, the latter being operated at its maximum speed as in step E4; and
- the application of a degraded control mode to the electric motor ME, promoting Joule heating. To do this the processor EVC for example reads from a specific map of this degraded mode the current values to be applied to the stator and/or to the rotor to obtain the motor torque required by the driver, and controls the transistors of the inverter OND accordingly. These current values allow the electric motor to be heated more than if the current values of a nominal use mode of the vehicle VE, delivering the same motor torque value but privileging the efficiency of the electric motor in order to discharge the drive battery Batt as little as possible, were used. This heating of the electric motor is implemented only when the vehicle is in drive mode so as not to generate undesired motor torque that could cause the vehicle to move when the latter is stopped.

This step E8 is carried out:

provided that it is not detected, in a step E9, that the measured insulation resistance Ri has increased above the preset threshold, or that the relays REL have opened; and within the limit of a duration t of activation of the fan VR and of application of the degraded control mode of the electric motor, which duration is shorter than a preset activation duration T2 of 5 minutes for example. This activation duration T2 is calibrated depending on the time required to re-establish a satisfactory level of insulation in the case where the insulation fault is due to moisture and both the fan VR and stator and/or rotor currents are used as the means for drying the electric motor ME. As a variant embodiment this second preset duration T2 may be selected to be equal to the first preset duration T1. In yet another variant, the maximum duration of activation of the fan VR in this step E8 is different from the maximum duration of activation of the degraded control mode of the electric motor ME, for example longer than the latter duration. The fan VR is for example activated all the time the vehicle VE is in drive mode, but not necessarily at its maximum speed throughout this time, so as to keep the temperature of the electric motor ME below a preset threshold.

If it is detected in a step E9 that the measured insulation resistance Ri has increased above the preset threshold, or that the relays REL have opened, then the cooling fan VR is deactivated and a nominal control mode is reapplied to the electric motor ME, in a step E7.

Likewise, if in the step E8 the duration of activation of the fan VR reaches the preset duration T2 then the fan VR is deactivated and a nominal control mode is reapplied to the electric motor ME in a step E6. In addition a degraded mode of use of the vehicle VE in which recharging of the drive battery Batt is prevented is applied in this step E6.

If the drying strategy implemented is stopped in a step E7, i.e. following the restoration of the insulation resistance value to above the preset threshold, then it will possibly be repeated following new steps E1 and E2 of detection of too low a measured insulation resistance and closed battery relays REL.

Although in this preferred embodiment the vehicle VE is an electric vehicle, the invention is applicable to a partially electric vehicle such as a hybrid vehicle. Likewise other embodiments are possible in which for example only drying by the cooling fan and not by heating of the electric motor with static currents is used, or in which the controlling method is distributed between a plurality of processors of the vehicle not all of which form part of the electric drive system of the vehicle.

The invention claimed is:

1. A method for controlling an electric drive system of a vehicle including an electric drive motor, a drive battery, and a drive inverter, said method comprising:

detecting that a measurement of an insulation resistance between said battery and a chassis of the vehicle is below a preset threshold;
   detecting a closed state of relays connecting said battery to said inverter;
   determining whether the vehicle is in drive mode; and
   following the detecting the measurement, the detecting the closed state, and the determining whether the vehicle is in the drive mode, activating a cooling fan of said electric drive motor until detecting that a measurement of said insulation resistance is above said preset threshold, within a limit of a first preset duration.

2. The method as claimed in claim 1, further comprising:
   following the detecting the measurement, the detecting the closed state, and the determining whether the vehicle is in the drive mode, applying, when the determining determines that the vehicle is in the drive mode, a degraded control mode to said electric motor, generating Joule heating, until detecting that a measurement of said insulation resistance is above said preset threshold, within a limit of a second preset duration.

3. The method as claimed in claim 2, further comprising:
   applying a degraded mode preventing recharging of said battery by an external power grid when the measurement of said insulation resistance is detected to be below said preset threshold at an end of the first or second preset durations.

4. An electric drive system for a vehicle including an electric drive motor, a drive battery, a drive inverter, and a fan to cool said electric drive motor, said drive system comprising:
   means for measuring an insulation resistance between said battery and a chassis of the vehicle;
   means for comparing measurements issued from said measuring means with a preset threshold;
   means for detecting a closed state of relays connecting said battery to said inverter; and
   means for determining whether the vehicle is in drive mode,
   wherein, when said measurements are below said preset threshold and after determining whether the vehicle is in the drive mode, said detecting means activate said fan to cool said electric drive motor for as long as the insulation resistance measured by said measuring means remains below said preset threshold, within a limit of a first preset duration.

5. The electric drive system as claimed in claim 4, wherein said detecting means activate, when the means for determining determines the vehicle is in the drive mode and when said measurements are below said preset threshold, means for controlling the electric motor into a degraded mode generating Joule heating, for as long as the insulation resistance measured by said measuring means remains below said preset threshold within a limit of a second preset duration.

6. The electric drive system as claimed in claim 5, further comprising:
   means for activating a degraded mode preventing recharging of said battery by an external power grid when the insulation resistance measured by said measuring means remains below said preset threshold at an end of the first or second preset durations.

7. An electric drive system for a vehicle including an electric drive motor, a drive battery, a drive inverter, and a fan to cool the electric drive motor, the electric drive system comprising:

circuitry configured to
  measure an insulation resistance between the battery and a chassis of the vehicle,
  compare measurements measured by the circuitry with a preset threshold,
  detect a closed state of relays connecting the battery to the inverter,
  determine whether the vehicle is in drive mode, and
  when the measurements are below the preset threshold and after determining whether the vehicle is in the drive mode, activate the fan to cool the electric drive motor for as long as the insulation resistance measured remains below the preset threshold, within a limit of a first preset duration.

8. The method as claimed in claim 1, wherein the activating of the cooling fan is performed only in response to the determining that the vehicle is in the drive mode.

9. The method as claimed in claim 1, further comprising:
  following the detecting the measurement, the detecting the closed state, and the determining whether the vehicle is in the drive mode, applying, when the determining determines that the vehicle is in the drive mode, a degraded control mode to said electric motor until detecting that a measurement of said insulation resistance is above said preset threshold, within a limit of a second preset duration.

10. The method as claimed in claim 1, further comprising:
  following the detecting the measurement, the detecting the closed state, and the determining whether the vehicle is in the drive mode, applying, when the determining determines that the vehicle is in the drive mode, a degraded control mode to said electric motor.

11. The method as claimed in claim 1, further comprising:
  following the detecting the measurement, the detecting the closed state, and the determining whether the vehicle is in the drive mode, applying a degraded control mode to said electric motor.

12. The electric drive system as claimed in claim 7, wherein the circuitry is further configured to, following measuring, detecting the closed state, and determining whether the vehicle is in the drive mode, apply a degraded control mode to said electric motor until detecting that a measurement of said insulation resistance is above said preset threshold, within a limit of a second preset duration.

* * * * *